United States Patent [19]
Thomson

[11] Patent Number: 5,831,877
[45] Date of Patent: Nov. 3, 1998

[54] BIT SEARCHING THROUGH 8, 16, OR 32 BIT OPERANDS USING A 32 BIT DATA PATH

[75] Inventor: Thomas William Schaw Thomson, Santa Cruz, Calif.

[73] Assignee: National Semiconductor Corporation, Santa Clara, Calif.

[21] Appl. No.: 451,204

[22] Filed: May 26, 1995

[51] Int. Cl.[6] .............................. G06F 7/00; G06F 15/00
[52] U.S. Cl. .............................. 364/715.011; 364/715.09; 364/715.1; 364/715.11; 395/562; 395/568
[58] Field of Search ............. 364/715.1, 715.06–715.11, 364/715.011; 395/566–568, 588, 589

[56] References Cited

U.S. PATENT DOCUMENTS

| | | | |
|---|---|---|---|
| 3,611,305 | 10/1971 | Greenspan et al. | 340/172.5 |
| 3,909,528 | 9/1975 | Augier de Cremiers | 375/362 |
| 5,060,143 | 10/1991 | Lee | 364/200 |
| 5,189,319 | 2/1993 | Fung et al. | 307/452 |
| 5,204,953 | 4/1993 | Dixit | 395/400 |
| 5,241,490 | 8/1993 | Poon | 364/715.04 |
| 5,254,888 | 10/1993 | Lee et al. | 307/480 |
| 5,259,006 | 11/1993 | Price et al. | 375/107 |
| 5,260,887 | 11/1993 | Ozaki | 364/715.04 |
| 5,349,681 | 9/1994 | Yoshida et al. | 395/800 |
| 5,404,473 | 4/1995 | Papworth et al. | 395/375 |
| 5,408,626 | 4/1995 | Dixit | 395/400 |
| 5,421,029 | 5/1995 | Yoshida | 395/366 |
| 5,568,410 | 10/1996 | Bechade | 364/715.1 |
| 5,570,306 | 10/1996 | Soo | 364/715.11 |
| 5,675,617 | 10/1997 | Quirk et al. | 375/365 |

FOREIGN PATENT DOCUMENTS 2036390  6/1980  United Kingdom .

OTHER PUBLICATIONS

Serra, Micaela & Dervisoglu, Bulent I, "Testing", Chapter 79, *The Electrical Engineering Handbook*, Richard C. Dorf, Editor-in-Chief, pp. 1808–1837, CRC Press.

L–T Wang et al., "Feedback Shift Registers For Self–Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

(List continued on next page.)

*Primary Examiner*—Emmanuel L. Moise
*Attorney, Agent, or Firm*—Limbach & Limbach L.L.P.

[57] ABSTRACT

A bit searching method shifts an operand and counts the number of shifts it takes to shift out the value one, thereby identifying the bit position in operand containing the value one. The operand is first compared to zero. If the operand is zero, the zero flag is set, otherwise, a register is initialized by being cleared for a bit search forward instruction or, for a bit search reverse instruction, being initialized to 15 for a 16-bit data length or 31 for a 32-bit data length For a bit search forward instruction, the operand is then shifted right one bit and the register is incremented, while for a bit search reverse instruction, the operand is shifted left one bit and the register is decremented. The operand is then examined to see if a 1 has been shifted out. If so, the register is read and decremented by 1 to yield the bit position of the operand where the first 1 was found. If not, then another shift and increment (decrement) step is performed.

3 Claims, 5 Drawing Sheets

OTHER PUBLICATIONS

Intel486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

BIT SEARCHING THROUGH 8, 16, OR 32 BIT OPERANDS USING A 32 BIT DATA PATH

BACKGROUND OF THE INVENTION

The present invention relates generally to microprocessor architecture, and more particularly to the architecture of a microprocessor execution unit which performs arithmetic and logic operations concurrently with address computations.

Many modern microprocessors have a "pipelined architecture" whereby the processor is divided into stages. This permits the processor to perform several tasks at once thereby allowing the processor to work on different parts of the instructions simultaneously as they are advanced through the pipe with each clock cycle. Under ideal conditions, one instruction can leave the pipeline and another instruction enter the pipeline every clock cycle. One such microprocessor is the Intel486™ microprocessor. Compatible x86-type microprocessors include those made by Advanced Micro Devices and Cyrix.

Arising out of the need for compatibility with older Intel microprocessor designs and the fact that it is a general purpose microprocessor, the x86 microprocessor has a complex instruction set architecture which includes over 400 instructions. However, some of these instructions are rarely used by either the operating system or the compiler. Thus, it would be desirable to optimize the architecture for commonly used instructions.

SUMMARY OF THE INVENTION

The present invention utilizes the resources of a microprocessor execution unit to perform bit searching instructions. The execution unit architecture is generally described as having an arithmetic unit and an addressing unit. The arithmetic unit performs arithmetic and logical operations on operands in response to control signals. The addressing unit operates in conjunction with the arithmetic unit to calculate linear addresses as well as offsets and limits.

The arithmetic unit includes a first portion for performing addition, subtraction and logical operations, a second portion for performing multiply, divide and single-bit shift operations, and a third portion for performing multi-bit shift and rotate operations. These resources are utilized to perform bit searching.

The method comprises sequential steps as follows. First the operand is compared to zero. If the operand is zero, set the zero flag. Otherwise, initialize a register. For a bit search forward instruction, the register is cleared. For a bit search reverse instruction, the register is initialized to 15 for a 16-bit data length or to 31 for a 32-bit data length.

The operand is then shifted and the register incremented or decremented. For a bit search forward instruction, the operand is shifted right one bit and the register is incremented. For a bit search reverse instruction, the operand is shifted left one bit and the register is decremented.

The shifter operand is then examined to see if a one has been shifted out. If not, then another shift and increment (decrement) step is performed. If so, then the register is read and decremented by 1 to yield the bit position of the operand where the first one was found.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
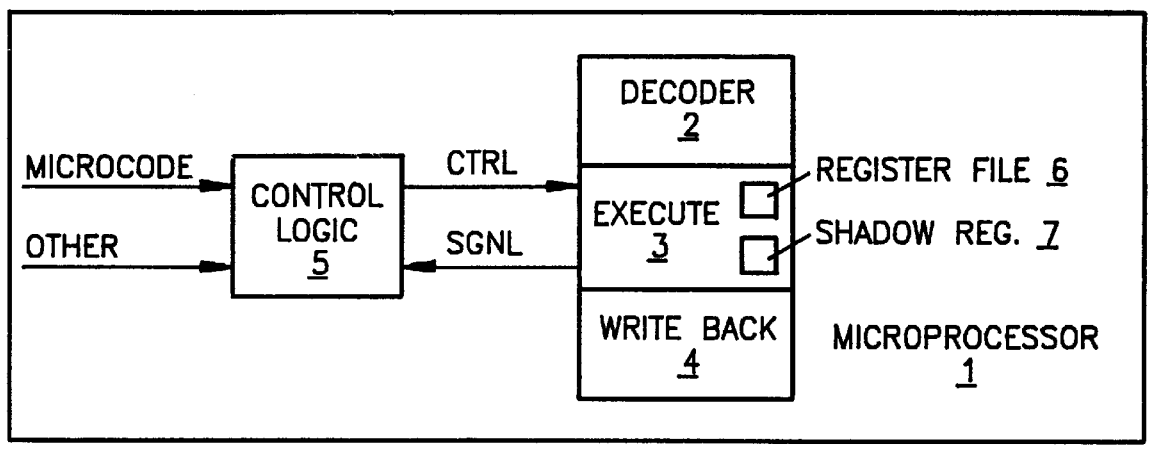
FIG. 1 is a block diagram showing portions of an integrated microprocessor system.

Referring now to FIG. 1, the preferred embodiment of the present invention is an integrated microprocessor system 1 having a pipelined architecture, wherein the pipeline includes, for example, a decoder stage 2, an execution unit 3 and a writeback stage 4. The present disclosure is directed to the execution unit 3, which provides a 32-bit data path for operands and instructions stored in general registers, including register file 6 and shadow register 7, and wherein arithmetic, logical and addressing computations are performed by the execution unit for programming instructions executed by the integrated microprocessor system 1.

The microprocessor system 1 includes a control logic unit 5 which is coupled to send control signals CTRL to the execution unit 3 and to receive data signals SGNL from the execution unit. The control logic unit 5 is also coupled to other components of the microprocessor system 1 and receives microcode and other input for making programmed control decisions.

The execution unit 3 is implemented to be substantially compatible with the Intel x86 instruction set, as set forth in the "Intel486™ MICROPROCESSOR FAMILY PROGRAMMER'S REFERENCE MANUAL," which is expressly incorporated herein by reference. The x86 instructions will be referenced herein in their common mnemonic form, such as ADD, SUB, MUL, DIV, etc.

Figure 2:
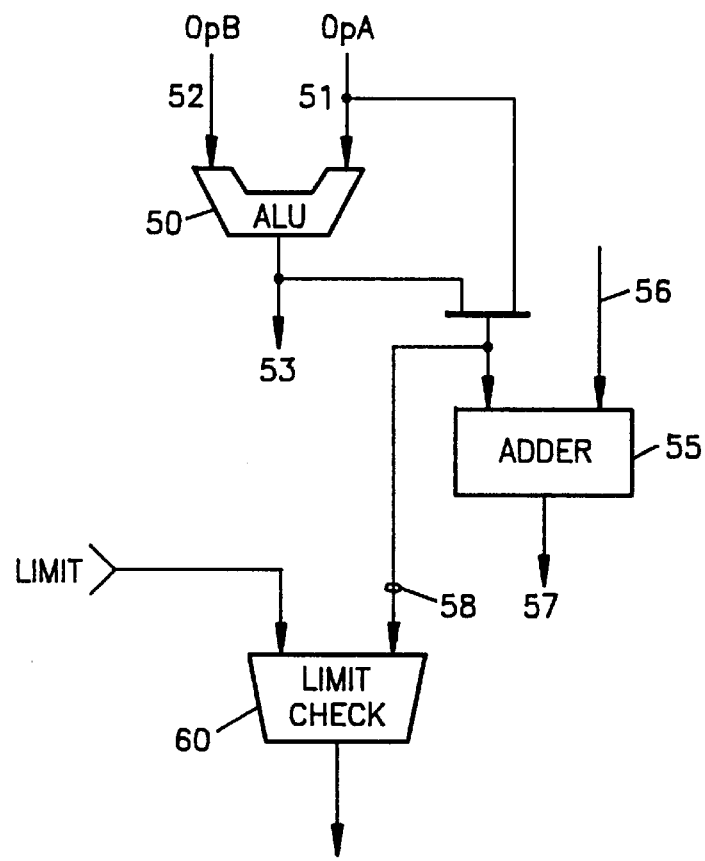
FIG. 2 is a functional block diagram of the execution unit portion of the integrated microprocessor system of FIG. 1.

A simplified functional diagram of the execution unit 3 is shown in FIG. 2. An arithmetic unit 50 has two inputs 51 and 52 for receiving operands OpA and OpB, respectively, from register file 6. The arithmetic unit 50 generates an arithmetic or logical result 53 in a single cycle for many x86 instructions.

The arithmetic unit 50 includes a first portion for performing addition, subtraction and logical operations, a second portion for performing multiply, divide and single-bit shift operations, and a third portion for performing multi-bit shift and rotate operations, as will be shown and described in more detail below.

An addressing unit 55 has one input selectively coupled to the output of the arithmetic unit 50 or to OpA. When an addressing instruction is received, the segment base component is provided to the addressing unit 55 on input 56, and the base, index, or displacement components, or immediate segment address operands, are provided to the arithmetic unit 50 on inputs 51 and 52. The addressing unit 55 then sums the address components to yield output 57 which is a linear address.

A limit check unit 60 is provided to make sure the offset 58, i.e., output 53 or OpA, is not addressing a location outside of the segment as determined by the control signal LIMIT.

Figure 3:
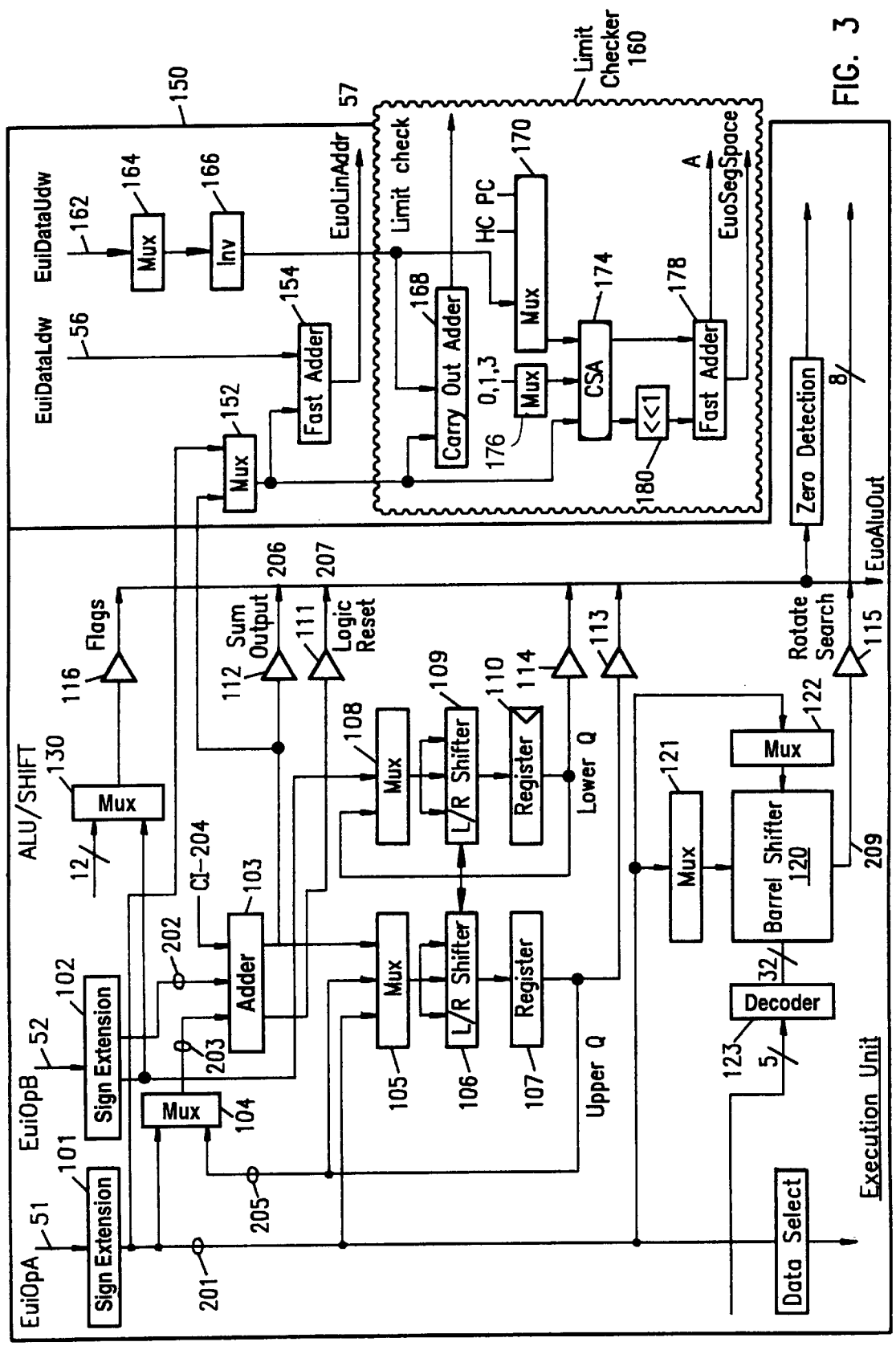
FIG. 3 is a more detailed block diagram of the execution unit of FIG. 2.

Referring now to FIG. 3, the execution unit 3 is illustrated in greater detail. It should be apparent to one versed in the art that each component of the execution unit described below is controlled or selected by one or more control signals provided by the control logic unit 5. However, a detailed description of these control signals in not necessary for a complete understanding of the invention.

Operand A is received into a sign extension unit 101. Sign extension unit 101 is a 3:1 multiplexor that selects a byte and sign extends it into 32 bits, or selectes a word and sign extends it into 32 bits, or selects a dword, and then outputs the 32 bit result $a_{in}$ onto data line 201. The term "sign extend" means copying the sign bit into the 24 highest order bits for a byte or into the 16 highest order bits for a word.

Operand B is received into a sign extension unit 102. Sign extension unit 102 includes a 5:1 multiplexor that selects a signed byte and sign extends it into 32 bits, or a signed word and sign extends it into 32 bits, or an unsigned byte and sign extends it into 32 bits, or an unsigned word and sign extends it into 32 bits, or a dword. The output 202 is a 32 bit result $b_{in}$. Sign extension unit 102 also includes a 2:1 multiplexor that selects OpB or its complement.

An adder 103 receives and operates upon data lines 202 and 203 and carry input CI 204. Data line 203 is from the output of a 2:1 multiplexor 104, which selects either $a_{in}$ data line 201 or UpperQ data line 205.

Adder 103 performs logical operations on data lines 202 and 203 to generate logic output 207, which is available to the user through output gate 111. The adder 103 also performs addition on data lines 202, 203 and 204 to generate sum output 206, which is available to the user through output gate 112.

Two 32 bit registers are provided for performing multiply, divide and single-bit shift operations. For the upper 32 bits, a 3:1 multiplexor 105 selects from $a_{in}$ data line 201, UpperQ data line 205, or SUM data line 207. The selected value may be shifted either left or right by one bit by left/right shifter 106 and then stored in register 107. For the lower 32 bits, a 2:1 multiplexor 108 selects from $b_{in}$ data line 202 or from LowerQ data line 208. The selected value may be shifted either left or right by one bit by left/right shifter 109 and then stored in register 110. The least significant bit (LSB) of left/right shifter 106 is coupled to the most significant bit (MSB) of left/right shifter 109 to permit up to 64 single bit position shifts.

The UpperQ register 107 provides an output data line 205 which is fed back to multiplexor 104 or multiplexor 105, as described above, or made available to the user through output gate 113. The LowerQ register 110 provides an output data line 208 which is fed back to multiplexor 108 as described above, or available to the user through output gate 114.

A barrel shifter 120 comprising a 32 by 32 transistor array is provided for performing multi-bit shift and rotate operations. A pair of 32 bit 2:1 multiplexors 121, 122 couple the $a_{in}$ data line 201 to the barrel shifter 120. A 5 bit decoder 123 provides 32 output signals, only one of which is true, to the barrel shifter 120, thus selecting one row of the barrel shifter. The output 209 of the barrel shifter 120 is available to the user through output gate 115.

A multiplexor 130 selectively outputs status flags from the execution unit 3 through output gate 116, as shown in Table I:

TABLE I

| Flag | Function |
| --- | --- |
| CF | Carry flag: Carry or Borrow from most-significant bit |
| PF | Parity Flag: Exclusive NOT of lower 8 bits of result |
| AF | Auxiliary Flag: Carry of Borrow from bit 8 |
| ZF | Zero Flag: Zero result set ZF to 1; else ZF is cleared |
| SF | Sign Flag: set to most-significant bit of result |
| OF | Overflow Flag: set to 1 is two's complement overflow occurs; else cleared |

The addressing unit includes a 4:1 multiplexor 152 that selects the $a_{in}$ data line 201 if it is a dword, or zero extends the $a_{in}$ data line 201 if it is a word, or the SUM output 206 if a dword, or zero extends the SUM output if a word. The term "zero extend" means copying a zero into the 24 highest order bits for a byte or into the 16 highest order bits for a word.

An adder 154 receives the output from multiplexor 152 as well as the segment base value on data line 56 and adds the two values together, thereby generating a linear address 57.

A limit check unit 160 is also provided in execution unit 3. The address includes a 20 bit limit value 162 which is stored in the shadow register 7. This limit value is provided to multiplexor 164, where it is scaled to 32 bits, depending on the value of the granularity bit, then inverted through 32 bit inverter 166. The output of inverter 166 is coupled to an adder 168, in which only the carry out function is used, and to a multiplexor 170. The output of multiplexor 152 is also coupled to adder 168. The output B of adder 168 indicates that the offset is below the scaled limit value.

The multiplexor 170 is provided with constants HC (half ceiling) and FC (full ceiling), which provide the maximum value for addressing computations and cause selection of either 16 bit addresses (HC) or 32 bits addresses (FC). The output of multiplexor 170, which is the upper limit for address computations, is fed to adder 174, which is a carry save adder (CSA). Additional inputs to CSA 174 are from multiplexor 152 and multiplexor 176. Additional constant inputs 0, 1 and 3 are provided to the multiplexor 176 to define the instruction length, i.e., 0=byte, 1=word, and 3=dword.

The output of CSA 174 is fed to the input of adder 178 and to a single bit left shift unit 180, which effectively multiplies the value of the carry bits by 2. The output of shift unit 180 is fed to the adder 178. The output SegSpace of adder 178 is used for a limit calculcation by a prefetch unit (not shown) and the output A of adder 178 indicates that the offset in above the scaled limit value.

The operation of execution unit 3 for arithmetic and logical instructions will now be described in more detail.

Instructions for addition, subtraction, and logical operations are carried out in a conventional manner by utilizing the resources of adder 103.

Instructions for multiplication and division are carried out by using the adder 103, the upper shifter comprising multiplexor 105, shifter 106 and register 107, and the lower shifter comprising multiplexor 108, shifter 109 and register 110. Generally, most multiplication and division instructions are performed according to conventional algorithms, i.e., shift and add for multiplication, and subtract and shift for division operations.

For a division operation, if the value of $a_{in}$ is greater than the value stored in registers 107, 110, then 0 is entered and the shifter is selected, else 1 is entered and the adder 103 is selected. For a multiplication operation, if OpA equals 1, then the adder 103 is selected, else the shifter is selected.

A division example of 50 by 7 yields a quotient of 7 with a remainder of 1, as shown in Table II (truncated to 8 bits):

TABLE II

| Cycle | Register 107+110 | Shifter 106+109 | Adder 103 |
|---|---|---|---|
| 1 | 0011 0010 | 0110 0100 | 1111 |
| 2 | 0110 0100 | 1100 1001 | 0101 |
| 3 | 0101 1001 | 1011 0011 | 0100 |
| 4 | 0100 0011 | 1000 0111 | 0001 |
| 5 | 0001 0111 | xxxx xxxx | xxxx |

Figure 4:
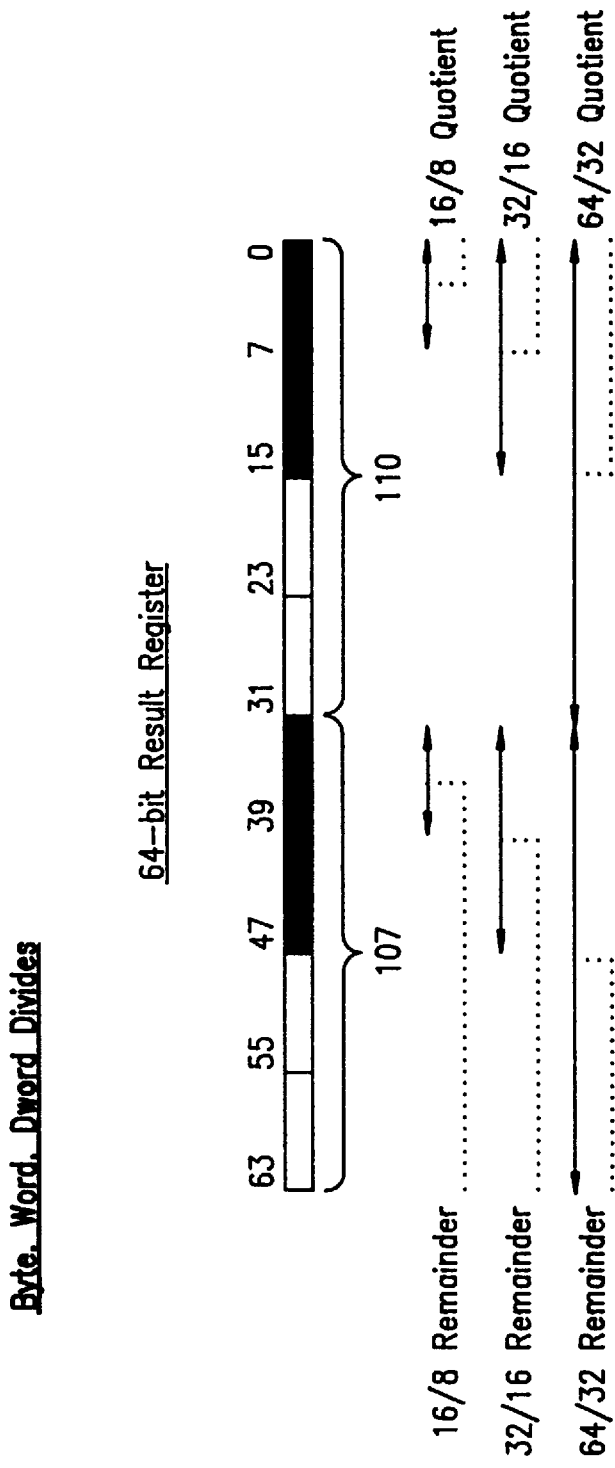
FIG. 4 is a schematic diagram of the result registers for a division operation.

Register 110 is used to provide the quotient while register 107 is used to provide the remainder, as illustrated in FIG. 4. Thus, for byte operations, the lower 8 bits of register 110 contain the quotient while the lower 8 bits of register 107 contain the remainder. For word operations, the lower 16 bits of register 110 contain the quotient while the lower 16 bits of register 107 contain the remainder. For dword operations, all 32 bits of register 110 contain the quotient while all 32 bits of register 107 contain the remainder.

Further discussion of the IDIV instruction can be found in commonly assigned, copending application entitled "METHOD FOR PERFORMING SIGNED DIVISION" by H. John Tam and filed on May 26, 1995 U.S. patent application Ser. No. 08/451,571.

A multiplication example of 10 by 5 yields a product of 50, as shown in Table III (truncated to 8 bits):

TABLE III

| Cycle | Register 107+110 | Shifter 106+109 | Adder 103 |
|---|---|---|---|
| 1 | 0000 0000 | 0000 0000 | 1111 |
| 2 | 1010 0000 | 0101 0000 | 0101 |
| 3 | 0101 0000 | 0010 1000 | 0100 |
| 4 | 1100 1000 | 0110 0100 | 0001 |
| 5 | 0110 0100 | 0011 0010 | 1101 |
| 6 | 0011 0010 | xxxx xxxx | xxxx |

Figure 5:
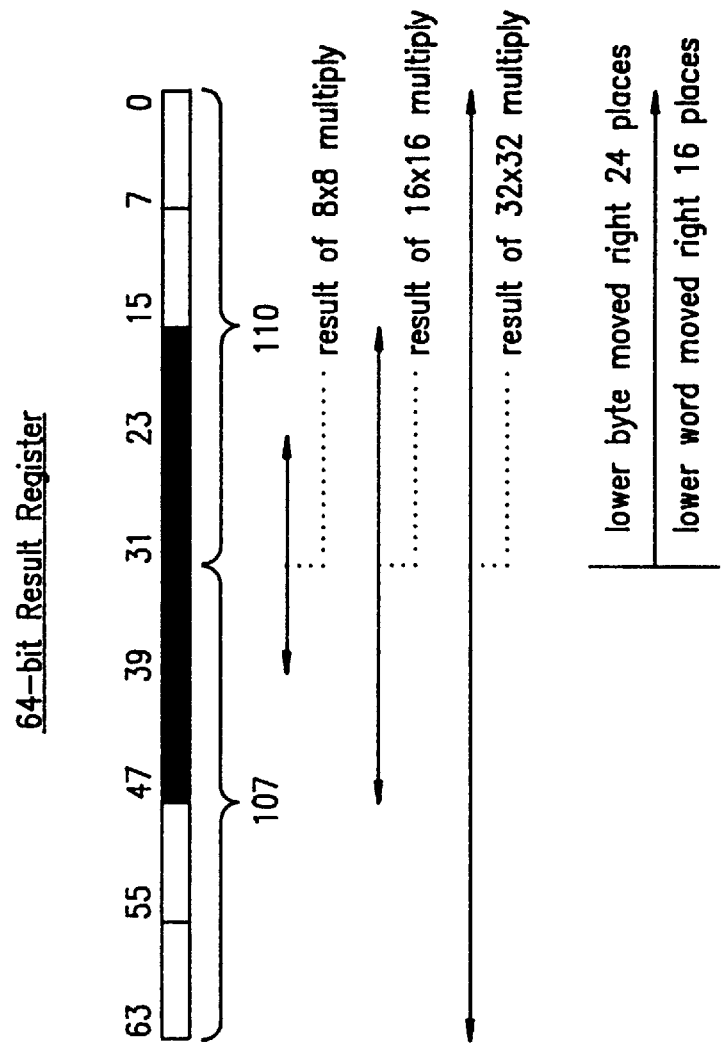
FIG. 5 is a schematic diagram of the result registers for a multiplication operation.

The product of a multiplication operation is contained in registers 110 and 107 as illustrated in FIG. 5. Thus, for byte operations, a 16-bit result is contained in the upper 8 bits of register 110 and the lower 8 bits of register 107. For word operations, a 32-bit result is contained in the upper 16 bits of register 110 and the lower 16 bits of register 107. For dword operations, a 64-bit result is contained all 32 bits of register 110 and all 32 bits of register 107.

The barrel shifter 120 and associated multiplexors 121 and 122 may be used to carry out multi-bit shift and rotate operations. A more complete description of the barrel shifter may be found in the following commonly assigned, copending application: "BARREL SHIFTER" by Thomas W. S. Thomson and H. John Tam, as filed on May 26, 1995, now U.S. Pat. No. 5,652,718.

One application of the barrel shifter and associated hardware is for bit searching instructions. For example, the BSR and BSF instructions use the barrel shifter to sequentially look at the bits in the operand while using the adder 103 and the upper register 107 as a counter to count the number of shifts.

In the BSF instruction (bit search forward), the barrel shifter-shifts the operand right on every cycle and adds 1 to the register for each shift. Thus, the operand can be searched from bit 0 to bit 31. Likewise, the BSR instruction (bit search reverse) shifts the operand left and subtracts 1 from the register on every cycle. Thus, the operand will be searched in the opposite direction, i.e., from bit 31 to bit 0. Both instructions stop when the first 1 is encountered. However, for the BSF instruction, the register 107 is cleared initially, while for the BSR instruction, the register 107 is initialized to 15 if the operand has a 16 bit data length or to 31 if the operand has a 32 bit data length.

Figure 6:
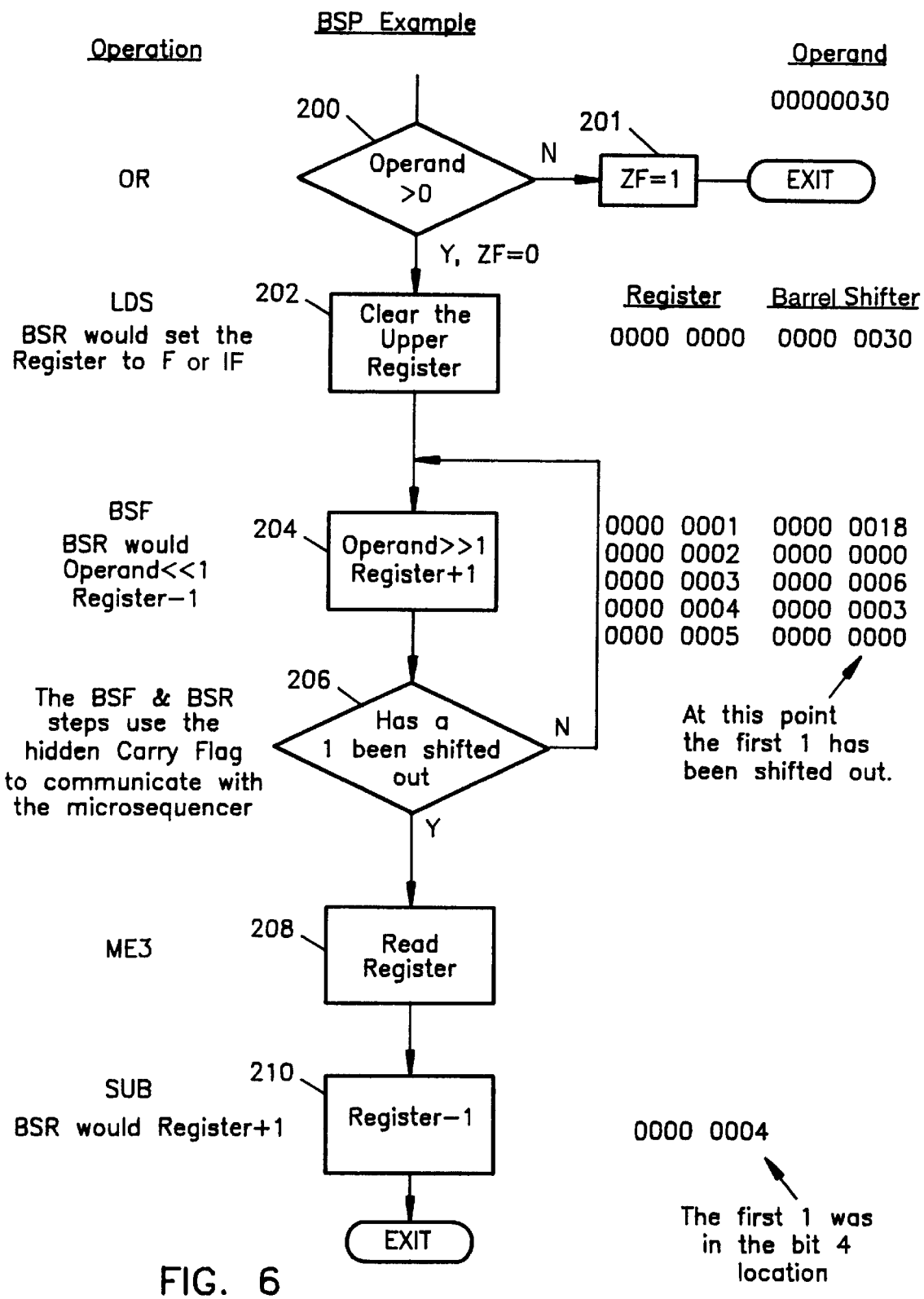
FIG. 6 is a flow chart illustration a bit search instruction.

FIG. 6 is a flow chart illustrating the BSF instruction on an operand of 48 (30 hex). In step 200, the operand is compared to 0. If the operand is not greater than zero, the zero flag ZF is set to 1 at step 201 and the instruction returns. In step 202, the upper register 107 is cleared. (For the BSR instruction, the register 107 would be set to F or 1F). In step 204, the operand is shifted right by 1 and 1 is added to the register. In step 206, the output of the barrel shifter is checked to see if a 1 has been shifted out. If not, the program returns to step 204 and shifts and adds again. If so, then the register is read in step 208 and then decremented by 1 in step 210. The register count reveals that the first 1 was found in the bit 4 position.

Another application of the barrel shifter and associated hardware is described in the following commonly assigned, copending application: "METHOD FOR PERFORMING ROTATE THROUGH CARRY USING A 32-BIT BARREL SHIFTER AND COUNTER" by H. John Tam, as filed on May 26, 1995, now U.S. Pat. No. 5,682,339.

The invention embodiments described herein have been implemented in an integrated circuit which includes a number of additional functions and features which are described in the following co-pending (all filed on May 26, 1995), commonly assigned patents and patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" now abandoned; U.S. Pat. No. 5,696,994, entitled "SERIAL INTERFACE CAPABLE OF OPERATING IN TWO DIFFERENT SERIAL DATA TRANSFER MODES"; U.S. patent application Ser. No. 08/453,076, entitled "HIGH PERFORMANCE MULTI-FUNCTION DIRECT MEMORY ACCESS (DMA) CONTROLLER" now abandoned; U.S. patent application Ser. No. 08/452,001, entitled "OPEN DRAIN MULTI-SOURCE CLOCK GENERATOR HAVING MINIMUM PULSE WIDTH" now abandoned; U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" now abandoned; U.S. Pat. No. 5,655,139, entitled "EXECUTION UNIT ARCHITECTURE TO SUPPORT x86 INSTRUCTION SET AND x86 SEGMENTED ADDRESSING"; U.S. Pat. No. 5,652,718, entitled "BARREL SHIFTER"; U.S. Pat. No. 5,687,102, entitled "DOUBLE PRECISION (64-BIT) SHIFT OPERATIONS USING A 32-BIT DATA PATH"; U.S. patent application Ser. No. 08/451,571, entitled "METHOD FOR PERFORMING SIGNED DIVISION"; U.S. Pat. No. 5,682,339, entitled "METHOD FOR PERFORMING ROTATE THROUGH CARRY USING A 32-BIT BARREL SHIFTER AND COUNTER"; U.S. patent application Ser. No. 08/451,434, entitled "AREA AND TIME EFFICIENT FIELD EXTRACTION CIRCUIT"; U.S. Pat. No. 5,617,543, entitled "NON-ARITHMETICAL CIRCULAR BUFFER CELL AVAILABILITY STATUS INDICATOR CIRCUIT"; U.S. patent application Ser. No. 08/445,563, entitled "TAGGED PREFETCH AND INSTRUCTION DECODER FOR VARIABLE LENGTH INSTRUCTION SET AND METHOD OF OPERATION"; U.S. Pat. No. 5,546,353, entitled "PARTITIONED DECODER CIRCUIT FOR LOW POWER OPERATION"; U.S. Pat. No. 5,649,147, entitled "CIRCUIT FOR DESIGNATING INSTRUCTION POINTERS FOR USE BY A PROCESSOR DECODER"; U.S. Pat. No. 5,598,112, entitled "CIRCUIT FOR GENERATING A DEMAND-BASED GATED CLOCK"; U.S. Pat. No. 5,583,453, entitled "INCREMENTOR/DECREMENTOR"; U.S. patent application Ser. No. 08/451,150, entitled "A PIPELINED MICROPROCESSOR THAT PIPELINES MEMORY REQUESTS TO AN EXTERNAL MEMORY"; U.S. patent application Ser. No. 08/451,198, entitled "CODE BREAKPOINT DECODER" now U.S. Pat. No. 5,717,909; U.S. Pat. No. 5,680,564, entitled "TWO TIER PREFETCH BUFFER STRUCTURE AND METHOD WITH BYPASS"; U.S. patent application Ser. No. 08/445,564, entitled "INSTRUCTION LIMIT CHECK FOR MICROPROCESSOR" now abandoned; U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" now abandoned; U.S. patent application Ser. No. 08/452,080, entitled "APPARATUS AND METHOD FOR EFFICIENT COMPUTATION OF A 486™ MICROPROCESSOR COMPATIBLE POP INSTRUCTION" now abandoned; U.S. patent application Ser. No. 08/450,154, entitled "APPARATUS AND METHOD FOR EFFICIENTLY DETERMINING ADDRESSES FOR MISALIGNED DATA STORED IN MEMORY" now abandoned; U.S. Pat. No. 5,692,146, entitled "METHOD OF IMPLEMENTING FAST 486™ MICROPROCESSOR COMPATIBLE STRING OPERATION"; U.S. Pat. No. 5,659,712, entitled "A PIPELINED MICROPROCESSOR THAT PREVENTS THE CACHE FROM BEING READ WHEN THE CONTENTS OF THE CACHE ARE INVALID"; U.S. patent application Ser. No. 08/451,507, entitled "DRAM CONTROLLER THAT REDUCES THE TIME REQUIRED TO PROCESS MEMORY REQUESTS" now abandoned; U.S. patent application Ser. No. 08/451,420, entitled "INTEGRATED PRIMARY BUS AND SECONDARY BUS CONTROLLER WITH REDUCED PIN COUNT" now abandoned; U.S. Pat. No. 5,612,637, entitled "SUPPLY AND INTERFACE CONFIGURABLE INPUT/OUTPUT BUFFER"; U.S. patent application Ser. No. 08/451,744, entitled "CLOCK GENERATION CIRCUIT FOR A DISPLAY CONTROLLER HAVING A FINE TUNEABLE FRAME RATE"; U.S. patent application Ser. No. 08/451,206, entitled "CONFIGURABLE POWER MANAGEMENT SCHEME"; U.S. patent application Ser. No. 08/452,350, entitled "BIDIRECTIONAL PARALLEL SIGNAL INTERFACE" now U.S. Pat. No. 5,710,939; U.S. patent application Ser. No. 08/452,094, entitled "LIQUID CRYSTAL DISPLAY (LCD) PROTECTION CIRCUIT" now U.S. Pat. No. 5,731,812; U.S. patent application Ser. No. 08/ , entitled "IN-CIRCUIT EMULATOR STATUS INDICATOR CIRCUIT"; U.S. patent application Ser. No. 08/450,156, entitled "DISPLAY CONTROLLER CAPABLE OF ACCESSING GRAPHICS DATA FROM A SHARED SYSTEM MEMORY"; U.S. Pat. No. 5,541,935, entitled "INTEGRATED CIRCUIT WITH TEST SIGNAL BUSES AND TEST CONTROL CIRCUITS"; U.S. Pat. No. 5,699,506, entitled "DECODE BLOCK TEST METHOD AND APPARATUS".

It should be understood that the invention is not intended to be limited by the specifics of the above-described embodiment, but rather defined by the accompanying claims.

What is claimed is:

1. A bit searching method, comprising the sequential steps of:
   a. comparing an operand to the value zero, wherein if the operand is greater than zero, proceed to step b, otherwise set a zero flag;
   b. initializing a register to a predetermined fixed value;
   C. shifting the operand by one bit position;
   d. changing the register value by one;
   e. examining the shifted operand, wherein if the value one has been shifted out, proceed to step f, otherwise return to step c;
   f. read the register value; and
   g. decrement the register by the value one, wherein the value now in the register represents the bit position in the operand where the first value one was found.

2. A method for searching for the first set bit in an operand register having n bits and identifying the bit position thereof, comprising the sequential steps of:
   a. setting a counter register to the value zero;
   b. shifting the operand register to the right by one bit position thereby shifting one bit out;
   c. incrementing the counter register by one;
   d. comparing the shifted out bit to the value one, wherein if equal to the value one, proceed to step e, otherwise return to step b; and
   e. decrementing the counter register by one; and
   f. examining the counter register, wherein the value now stored in the counter register represents the bit position in the operand register of the first set bit.

3. A method for searching for the first set bit in an operand register having n bits and identifying the bit position thereof, comprising the sequential steps of:
   a. setting a counter register to the value n−1;
   b. shifting the operand register to the left by one bit position thereby shifting one bit out;
   c. decrementing the counter register by one;
   d. comparing the shifted out bit to the value one, wherein if equal to the value one, proceed to step e, otherwise return to step b; and
   e. incrementing the counter register by one;
   f. examining the counter register, wherein the value now stored in the counter register represents the bit position in the operand register of the first set bit.

* * * * *